(12) United States Patent
Eichenlaub

(10) Patent No.: US 6,533,420 B1
(45) Date of Patent: Mar. 18, 2003

(54) APPARATUS AND METHOD FOR GENERATING AND PROJECTING AUTOSTEREOSCOPIC IMAGES

(75) Inventor: Jesse B. Eichenlaub, Penfield, NY (US)

(73) Assignee: Dimension Technologies, Inc., Rochester, NY (US)

(*) Notice: Subject to any disclaimer, the term of this patent is extended or adjusted under 35 U.S.C. 154(b) by 0 days.

(21) Appl. No.: 09/488,884

(22) Filed: Jan. 21, 2000

Related U.S. Application Data
(60) Provisional application No. 60/116,786, filed on Jan. 22, 1999.

(51) Int. Cl.[7] .................. G03B 21/00; G02B 27/22; G02F 1/1335
(52) U.S. Cl. .................. 353/7; 353/10; 359/462; 349/15
(58) Field of Search .................. 349/15; 359/462, 359/458, 466, 471, 472, 475, 477, 478, 479; 353/7, 10

(56) References Cited

U.S. PATENT DOCUMENTS

| | | | | |
|---|---|---|---|---|
| 5,465,175 A | * | 11/1995 | Woodgate et al. | 359/463 |
| 5,703,717 A | * | 12/1997 | Ezra et al. | 359/462 |
| 5,897,184 A | * | 4/1999 | Eichenlaub et al. | 349/64 |
| 5,993,003 A | | 11/1999 | McLaughlin | 353/7 |
| 6,115,059 A | * | 9/2000 | Son et al. | 348/46 |
| 6,229,561 B1 | * | 5/2001 | Son et al. | 348/42 |

OTHER PUBLICATIONS

Arimoto et al. "Wide Viewing Area Glassless Stereoscopic Display Using Multiple Projectors", Jan. 1998, SPIE vol. 3295, p 186–192.*
Tetsutani et al. "A Study on a Stereoscopic Display System Employing Eye–position Tracking for Multi–viewers", SPIE vol. 2177 pp. 135–142.*
Son et al. "A Multiview 3–D imaging system with full color capabilities", Jan. 1998, SPIE vol. 3295, pp. 218–219.*

* cited by examiner

*Primary Examiner*—Russell Adams
*Assistant Examiner*—Melissa J Koval
(74) *Attorney, Agent, or Firm*—Stephen B. Salai, Esq.; Donna P. Suchy, Esq.; Harter, Secrest & Emery LLP

(57) ABSTRACT

An apparatus and method for generating and projecting autostereoscopic images with a look around feature, in particular a device which creates several full resolution perspective views of a scene and makes each one visible within a different region of space in front of a special lens screen assembly on which the images are projected. The apparatus, including an illumination system, a light valve, a relay lens, a beam steering device, a plurality of projection lenses and mirrors, a focusing lens, and a screen assembly such that the mirrors focus light exiting the projection lenses and the screen assembly has a diffuser.

31 Claims, 14 Drawing Sheets

APPARATUS AND METHOD FOR GENERATING AND PROJECTING AUTOSTEREOSCOPIC IMAGES

This application claims the benefit of Provisional Application No. 60/116,786, filed Jan. 22, 1999.

FIELD OF THE INVENTION

This invention relates methods of generating and projecting autostereoscopic images.

BACKGROUND OF THE INVENTION

The quest to produce quality and technically effective three-dimensional images has continued for a number of years. Basically, there are two types of presentation methods or systems that are available for viewing three-dimensional images; these are broadly characterized as either stereoscopic or autostereoscopic.

In stereoscopic systems, pairs of ordinary two-dimensional still photographs or binocular motion pictures are made of an object from two points of view. The two points are separated by a distance equal to the distance between the eyes of a viewer. The pair of photographs or motion pictures are then viewed through a device that allows the right eye to see only the right image and the left eye only the left image. In this viewing system, each eye sees a slightly different image; thereby duplicating the conditions under which the original scene would have been viewed. Consequently, the viewer is aware of only one image that has a three-dimensional effect. Stereoscopic images are typically viewed with special glasses or other viewing equipment that separates what each eye views.

In autostereoscopic systems, it is not necessary for the viewer to wear special glasses or to use any other viewing implement to keep the two images separated. Wherever the observer is seated in a certain area in front of the display, each of his or her eyes will see a different image. Several methods of achieving this effect are known in the art. Past apparatuses of generating and projecting autostereoscopic images have often included multiple projectors and displays. For instance, McLaughlin discloses, in U.S. Pat. No. 5,993,003, a projection system that includes multiple projection systems with multiple CRT displays. This greatly increases the cost of such projection systems. It also increases the amount of room needed to generate the images.

SUMMARY OF THE INVENTION

The object of this invention was to create a method of generating and projecting autostereoscopic images that is more compact and less expensive then current methods.

In the preferred embodiments, the system has six major components: an illumination system, a light valve, a relay lens, a beam steering device, projection optics, and a screen assembly.

The illumination system concentrates bright light onto the light valve, as is typical of illumination sources for projector apparatuses of all kinds. The light valve spatially and temporally modulates the intensity of light falling on it, thus creating rapidly changing images. The relay lens magnifies the images and projects them onto a plane or surface within a beam steering device. The beam steering device causes the beam of light exiting from the image to change direction and to be focused so that it enters each of several projection lenses, one after the other in a repeating sequence. The projection lenses, placed in a row in front of the beam steering device, each project a larger version of the image seen in the beam steering device onto a larger screen assembly. The screen assembly, which contains one or more large positive lenses (such as Fresnel lenses), reimages the exit pupil of each of the projection lenses into a different region of space in the area where the observer sits, thus creating viewing zones from within which different images are visible.

DETAILED DESCRIPTION OF THE PREFERRED EMBODIMENT

Figure 1:
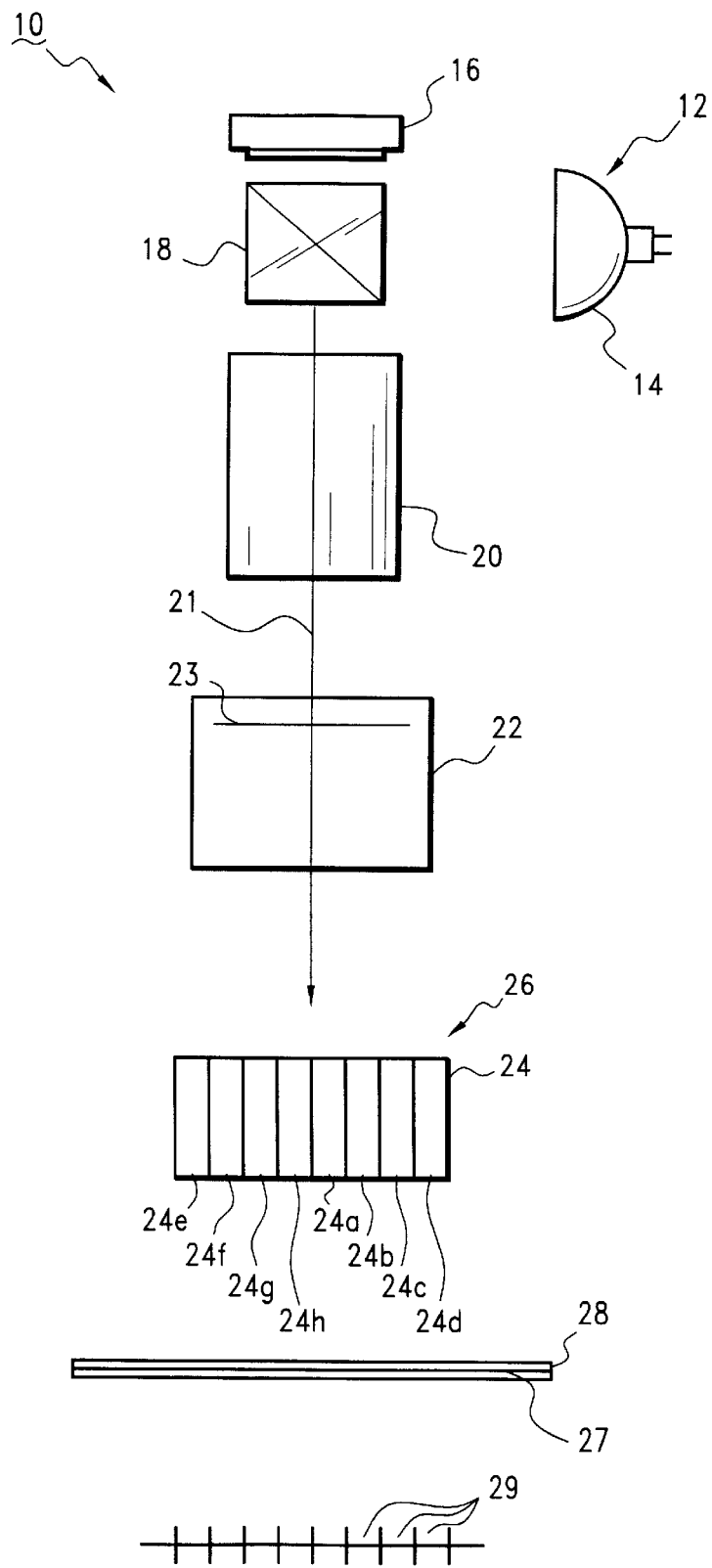
FIG. 1 is an illustration of the entire generating and projecting apparatus.

The system, in broadest generic terms, is illustrated in FIG. 1. It is designed to create autostereoscopic images using a very small, very fast image forming light valve, such as an ICFLCD. The major components and some alternatives for each one are described below.

FIG. 1 shows the apparatus for generating and projecting autostereoscopic images including an illumination system 12 with a light source 14. The apparatus 10 also includes a light valve 16, a reflective beam splitter 18 and a relay lens 20 that focuses light along a system optical axis 21 onto a beam steering device 22 containing a first image plane 23.

The light valve 15 spatially and temporally modulates the intensity of light falling on it, thus creating rapidly changing images. The relay lens 20 magnifies the images and projects, them on the first image plane 23 within the beam steering device 22. The beam steering device 22 causes the beam of light exiting from the image along the system optical axis 21 to change direction and to be focused to enter one or more projection lenses 24 in the projection lens assembly 26 sequentially. Each projection lens 24 projects a larger version of the beam steering device image onto a second image plane 27 in a larger screen assembly 28 which is visible in one or more viewing zones 29 that can be optimized. Since each different viewing zone 29 is created in a different region of space, an observer sitting in different viewing zones 29 will view different images.

The Illumination System

The illumination system 12 used with this invention can be basically the same as those used in other, conventional projection systems and includes the light source 14 which can be an arc lamp or a halogen lamp and reflector and condensing lens system (not shown). The illumination system 12 concentrates as much light as possible onto the small area of the light valve 16. The ILC Cermax and Phillips UHP lamps are a good type of lamp to use in this invention. Microlasers are an alternative in certain applications where color quality and brightness are of prime concern, but cost is not.

Since all of the suitable light valves currently available for use with this invention are reflective devices, the illumination system is also likely to include the reflective beam splitter 18 directly in front of the light valve 16, as is shown in FIG. 1. The beam splitter 18 will allow some light from the light source 14 to reflect off of a 45 degree mirror, be reflected off the light valve 16, and then pass through the mirror on the way out, exiting in a direction 90 degrees from the light source 14. Half-reflective 45 degree mirrors or more efficient broadband polarizing beamsplitters similar to those made by Optosigma can be used. Alternatively, an off axis illumination system without a beamsplitters can be used, such as those that have been used in some displays employing the Texas Instrument's DLP light valve.

Other optional components to the illumination system 12 are advantageous in certain designs. For example, a simple rapid on/off electronic shutter (such as a liquid crystal shutter made by Displaytech) can be incorporated to block light from the light valve 16 during the time period when the image on it is changing, so as to prevent double images from being visible to observers.

Since all of the fast light valves on the market that are suitable for this type of display are monochrome devices, it is necessary to provide color by some means. An ideal method is to use field sequential color illumination. The light valve 16 would be made to generate images at a rate three times faster than before, so that during each of the time periods when light is being directed into one of the viewing zones, three different images are displayed in succession on the light valve. The first image displayed will be the red component of a single perspective image. The second image will be the green component, and the third image the blue component. As the color component images are displayed, the light valve is illuminated by red, green, and blue light in succession, so that light of the correct color is illuminating the display when the component image for that color is displayed. Such multicolor illumination can be achieved by using a fast electronic filter of the type made by Displaytech that can rapidly change from a red filter to a green to a blue. This color filter would be placed in the beam illuminating the light valve or the one exiting from it. In a field sequential color illumination system, the on/off electronic shutter would ideally be turned off, blocking light, while the light valve 16 or the sections of the light valve are being scanned and the pixels are changing to form the next color component image.

In still other configurations, the light from the light source 14 may be split into red, green and blue beams using dichroic mirrors, and each beam used to illuminate one of three different light valves, one of which at any given moment displays the red component of an image, one of which displays the blue component, and one of which displays the red component. This configuration is common in projectors where maximum possible brightness is desired.

The Light Valve

The light valve 16 can be any of a number of very fast, high resolution (1024×768 or 1280×1024) devices that are either on the market or soon to be on the market. Examples are the DLP micromirror devices made by Texas Instruments, ICFLCDs made by Displaytech and CRL, and others. These devices, though using different technologies, possess the common features of very small size (typically less than 15 mm diagonal) and very fast operating speeds (capable of presenting several thousand images per second).

In order to display multiple perspective views in succession without flicker, the light valve 16 must be capable of displaying NX60 images per second, where N is the number of perspective views. The number of perspective views will usually be eight or more. Therefore, in addition to possessing high resolution, the light valve 16 must be capable of generating at least 480 gray scale images per second. Depending on the light valve 16 chosen, this may require an operating speed of between 2880 and 3840 images per second in order to achieve gray scale through time based modulation. The ICFLCD and DLP are capable of such speeds. However, a newer type of ferro-electric light valve 16 is being developed, which produces gray scale by turning pixels partially on or off. Such a capability greatly reduces the required operating speed back to 480 images per second.

Since these light valves are all monochrome devices, displays using light valves of this type use either field sequential color imaging to obtain color or else use three valves, one for each color component.

A standard computer interface and/or a standard video camera interface must be included with the light valve assembly in order to receive sequential perspective views from a computer or from multiple video cameras. A fast computer could generate multiple perspective views that could be sent sequentially to the light valve. In the case of multiple video cameras, one image from each would most likely be simultaneously read into its own section of buffer memory, and then these images in memory would be sequentially read out to the light valve

The Relay Lens

The purpose of the relay lens 20 is to refocus and project the images from the light valve 16 into a different location, onto a beam steering device and also to enlarge them to a size in the 30 mm diagonal to 50 mm diagonal range. Projecting the image to the 38-mm.×38-mm size is usually necessary due to the very small size of the pixels on the original display, and the geometry of the system. In order that resolution limits due to diffraction do not degrade the projected image, the projection lenses would otherwise have to be fairly large relative to the lens to display distance, forcing the side lenses to be unacceptably far off axis.

The relay lens 20 must be a low distortion lens such as those designed for some CCD imaging applications. Such a lens would operate essentially in reverse of its intended function; that of focusing a large image onto a small CCD detector surface. It must have sufficient resolution and lack of aberrations to clearly image individual pixels on the light valve, which will typically be approximately 12 microns wide and subtend angles of no more than, about 0.5 minutes of arc as seen through the farthest off axis projection lens.

The Beam Steering System

There are several possible ways to make a beam steering system 22 with the first image plane 23 deflecting the beam of light exiting the image plane and focusing it into each of several projection lenses 24 in succession as part of the projection assembly 26. The preferred methods are described below. They can be divided into electro-optic systems and mechanical systems.

Electro-optic Beam Steering

Liquid Crystal Beam Deflectors

Figure 2:
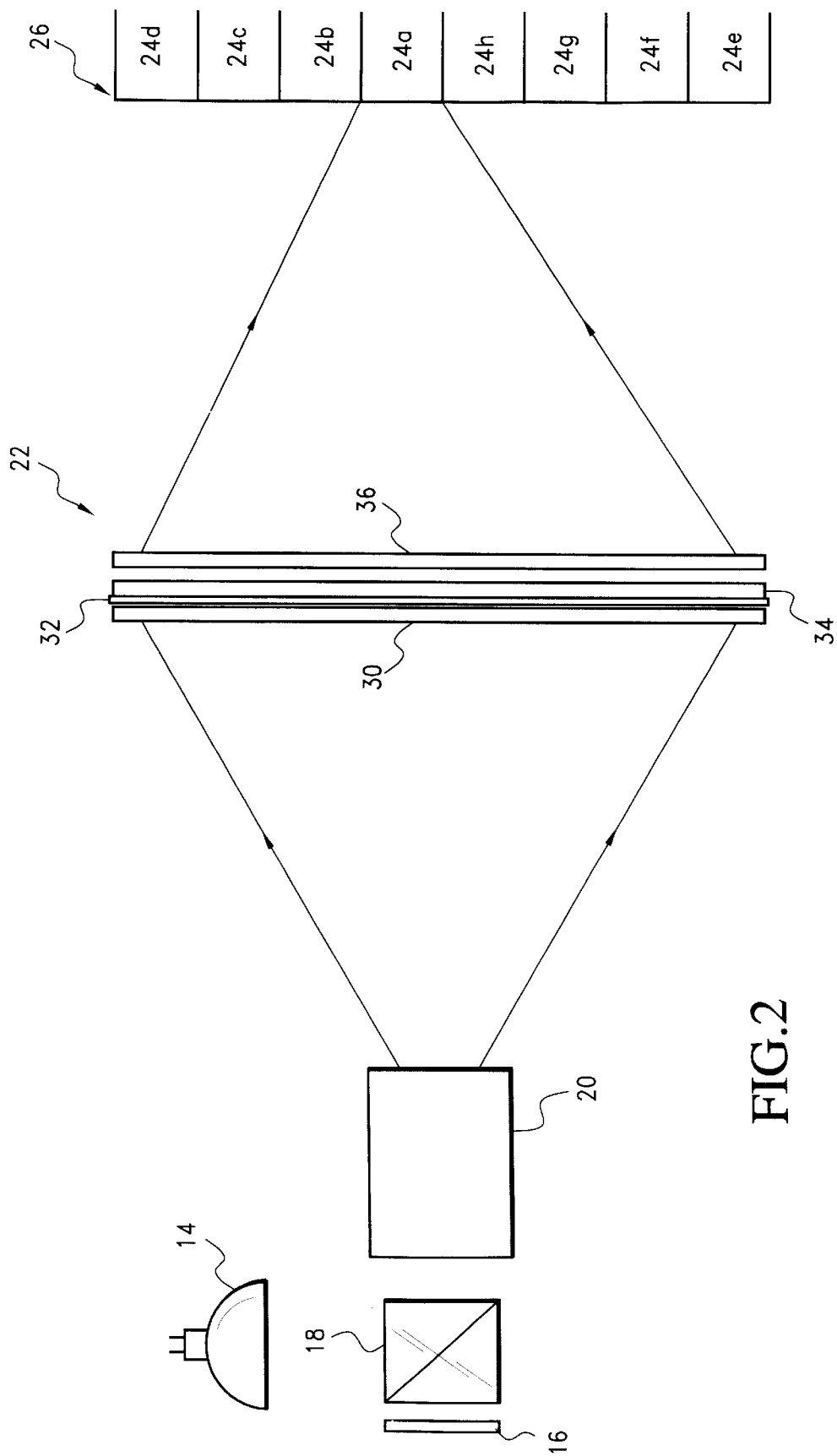
FIG. 2 is a top view of the entire generating and projecting apparatus.
Figure 3:
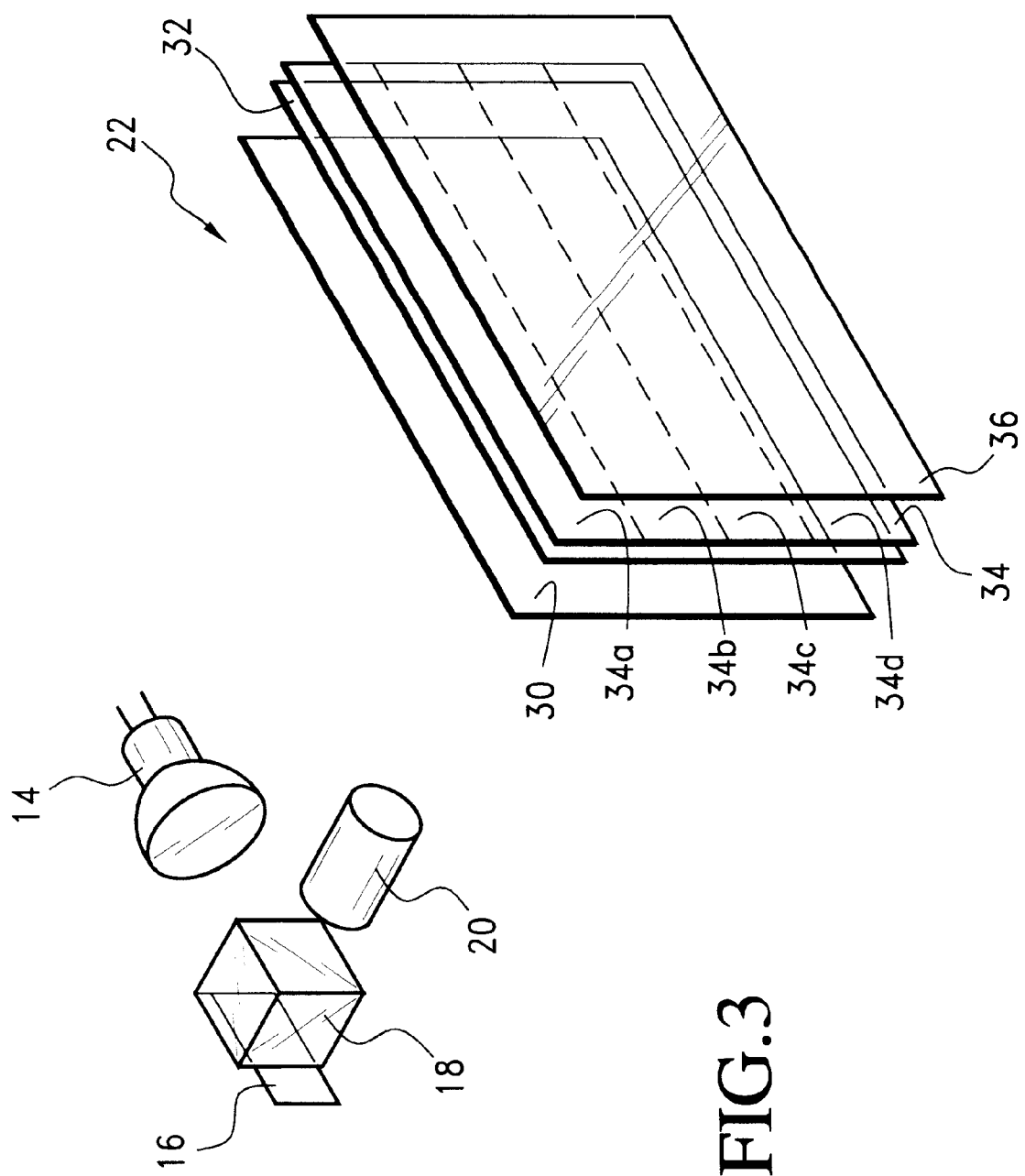
FIG. 3 is a perspective view of a representative liquid crystal based electronic beam steering screen.
Figure 4:
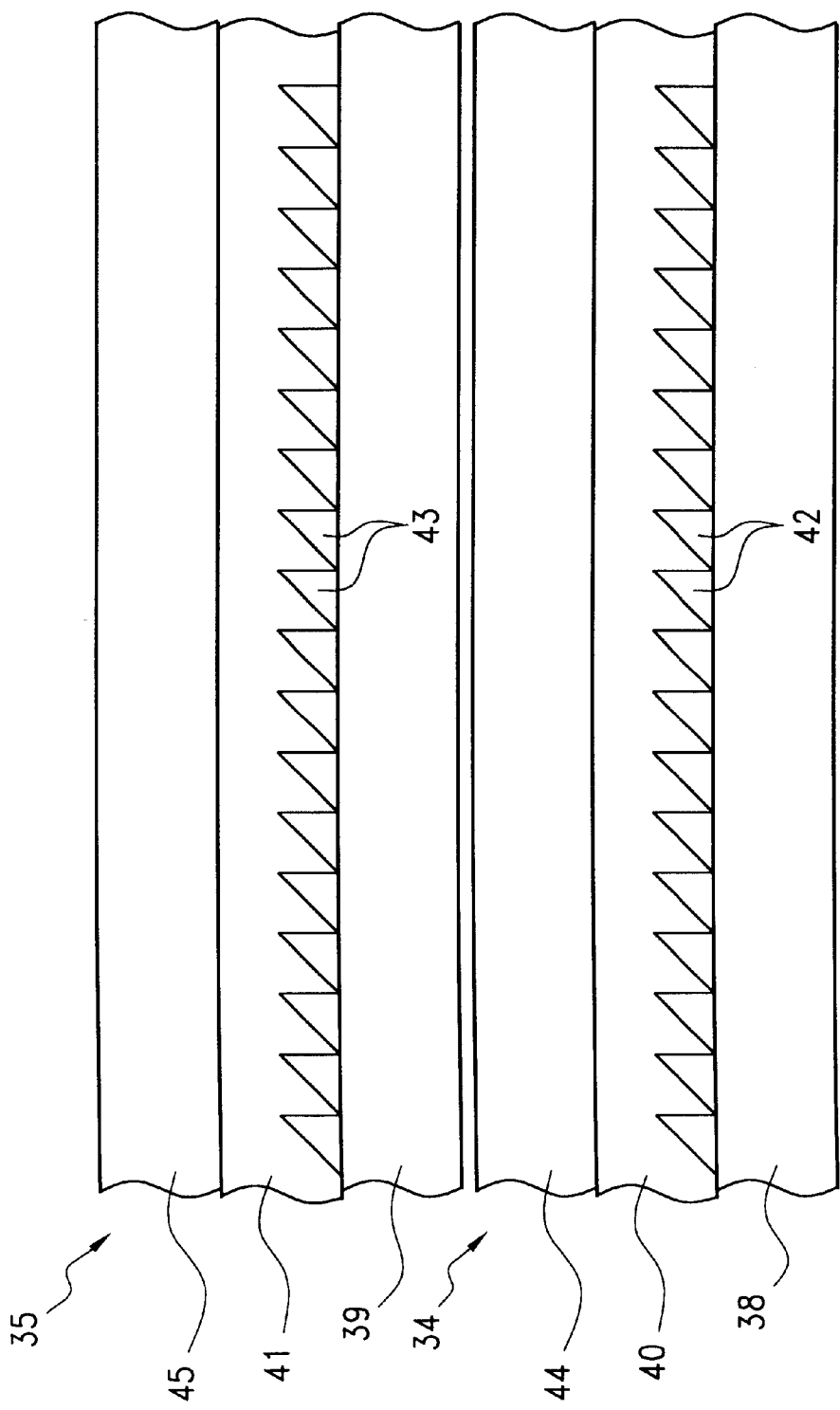
FIG. 4 is a cross-section of the beam steering screen.

A representative liquid crystal based electronic beam steering screen is illustrated in FIGS. 2, 3 and 4. FIG. 2 is a top view; FIG. 3 is a perspective view as seen from the area in front of the beam steering apparatus 22. FIG. 4 is a cross sectional view of beam steering device 34.

The relay lens 20 projects an image of the light valve 16 onto a special screen apparatus, as shown in FIG. 2. This apparatus 22 consists of four main parts: a positive lens 30, preferably being a Fresnel lens, ideally with a focal length equal to the distance between itself and the front of the projection lens, so as to nearly collimate the beam of light coming from the relay lens, also known as a projection lens 20; a diffusing sheet or screen 32 which is capable of diffusing light coming from the projection lens 20 into a rectangular pattern whose height is ideally greater than its width; and an electronic beam steering device 34 consisting of a structure which in one embodiment has multiple linear angled ridges 42 on one surface of glass 38, which is in contact with a layer of liquid crystal material 40 sandwiched between it and of glass 38 an (ideally) flat sheet of glass 44 or other transparent solid material of glass 38 (as shown in FIG. 4).

Both the sheet and the sheet with the ridges on it would possess a thin layer of transparent conductive material.

The linear angled ridges should have their long dimensions in a vertical direction.

A magnified cross-sectional view of the beam steering device 22 is shown in FIG. 4. Ideally, the layers of conducting material are split into multiple independently addressed sections also referred to as horizontal strips as shown in FIG. 3. In FIG. 3 the independently controlled horizontal sections are labeled 34a–d. The last part is a second lens 36, which could also be a Fresnel lens in some circumstances, which focuses the light coming from the beam steering device onto the row of projection lens assemblies 26 located a certain distance from the beam steering device's rear surface as shown in FIG. 2.

The liquid crystal material used in the beam steering device 22 must have the property that its refractive index, for light impinging near the normal to the flat front surface of the beam steering device, changes according to the direction that its molecules are oriented. Furthermore the molecules must change orientation depending on how much voltage is placed across the liquid crystal layer by means of charge applied to the transparent electrodes on either side of it. Furthermore the refractive index of the liquid crystal layer must ideally be higher than that of the material forming the angled ridges when the molecules are in one orientation, and the refractive index must be lower than that of the material forming the angled ridges when in another orientation.

Depending on how much voltage is applied across the LC layer, the molecules would orient themselves in one of these two orientations or somewhere in between. For example they might be in the low index orientation when no voltage is applied, and be in the high index orientation when voltage is applied.

Ideally, the liquid crystal material must also be fast responding—able to change its molecular orientation within 1-ms or less after voltage is applied across it. A type of ferro-electric liquid crystal material being used in experimental displays at the Naval Research Laboratory my be ideal for this purpose.

As can be seen from FIG. 4, more than one beam steering screen 34 may be put in place in order to increase the angle at which the beam of light from the projection lens is turned. These include several layers of glass and liquid crystal or plastic prism structures. These layers can include a first glass layer 38, a liquid crystal layer 40 with glass or plastic prism structures 42 and a second glass layer 44. FIG. 4 shows another embodiment of the beam steering device 22 that includes an optional second beam steering device 35 including a first glass layer 39, a liquid crystal layer 41 with glass or plastic prism structures 43 and a second glass layer 45. There are similar devices well known to the art that are conceptually similar. These use a liquid crystal layer in contact with a diffraction grating instead of the linear angled ridges to achieve the same effect.

The device operates as follows:

The light valve 16 is made to display a series of perspective views of an image in succession at a very rapid rate.

In the case of computer generated images, these perspective views are images of a scene generated from a series of eye points spaced evenly along a horizontal line in front of the scene, with one eye point for each viewing zone. For video images the perspective views would be taken by a series of cameras spaced evenly along a line in front of a scene, with one camera for each viewing zone. Generating perspective views in this manner for an autostereoscopic display is well known to the art.

Starting at time zero, when the display is turned on, the light valve 16 is addressed row by row, in typical fashion, and the pixels within it will start to change state to on, off, or some gray level in between. During the time period when the pixels are changing to form the first image, or are changing from one image to the next, the electronic shutter will be off, preventing light from being projected onto the screen assembly 22. After the image is formed on the light valve 16, the electronic shutter will open, and the projection lens 20 will project the image on the screen assembly 28. Ideally, the image would be projected onto the diffuser 32 within the screen assembly 28. We will assume for purposes of this example that the beam steering device 34 is initially set to a high index condition, so that the beam from the relay lens, after being collimated by the first lens, is deflected toward the top of the page in the top view of FIG. 2 (in other words, to the right as seen by a person looking at the display from the front). The light from it is spread out slightly by the diffuser and then focused by the second lens into the projection lens assembly marked 24a in FIG. 2.

Thus the first image will be visible only from the area within the beam of light exiting the screen assembly.

After the image is formed on the light valve, it will be displayed for a certain period of time, said time being typically short, less than 2-ms. At the end of this time period the address process starts again, row by row, and the light valve pixels start to change state to form the next image. At the same time that the address begins, or shortly before it, the electronic shutter will be turned off to block light, and voltage will be applied across the beam steering device in order to cause the liquid crystal molecules to reorient so as to have a different index of refraction for the impinging light. For purposes of this example, we will assume that the index takes on a slightly higher value.

After the light valve is scanned and all the pixels complete their change to form the next image, and the liquid crystal layer within the beam steering device completes its change of molecular orientation, the electronic shutter is opened and the image is projected onto the screen assembly. Now the beam is deflected in the same direction to a greater degree, and the second lens focuses light into the projection lens assembly labeled 24b in FIG. 2.

This process is repeated six more times in our example, causing the light from the next six images to be focused into the remaining projection lens assemblies 26 in succession shown as 24a–24h on FIG. 2. The process is then repeated again starting with the beam steering device in its original state, causing light to be focused into projection lens 24a again. If moving images are being presented, then the next set of eight images will be a perspective views of a slightly changed scene, collectively constituting the next frame of the moving 3D image.

The spots or areas into which light is focused after each image is formed would coincide with the position of the rearmost lens (i.e. the lens closest to the beam steering device) of one of the light turning lens assemblies (see below), so that as the system operated, light would be sequentially directed into each of the light turning lens assemblies.

As stated earlier, the conductive layers within the beam steering device 34a are ideally split into several independently controlled horizontal layers, (FIG. 3). The use of such layers can increase the length of time that the images are illuminated and thus increase apparent brightness.

Figure 5:
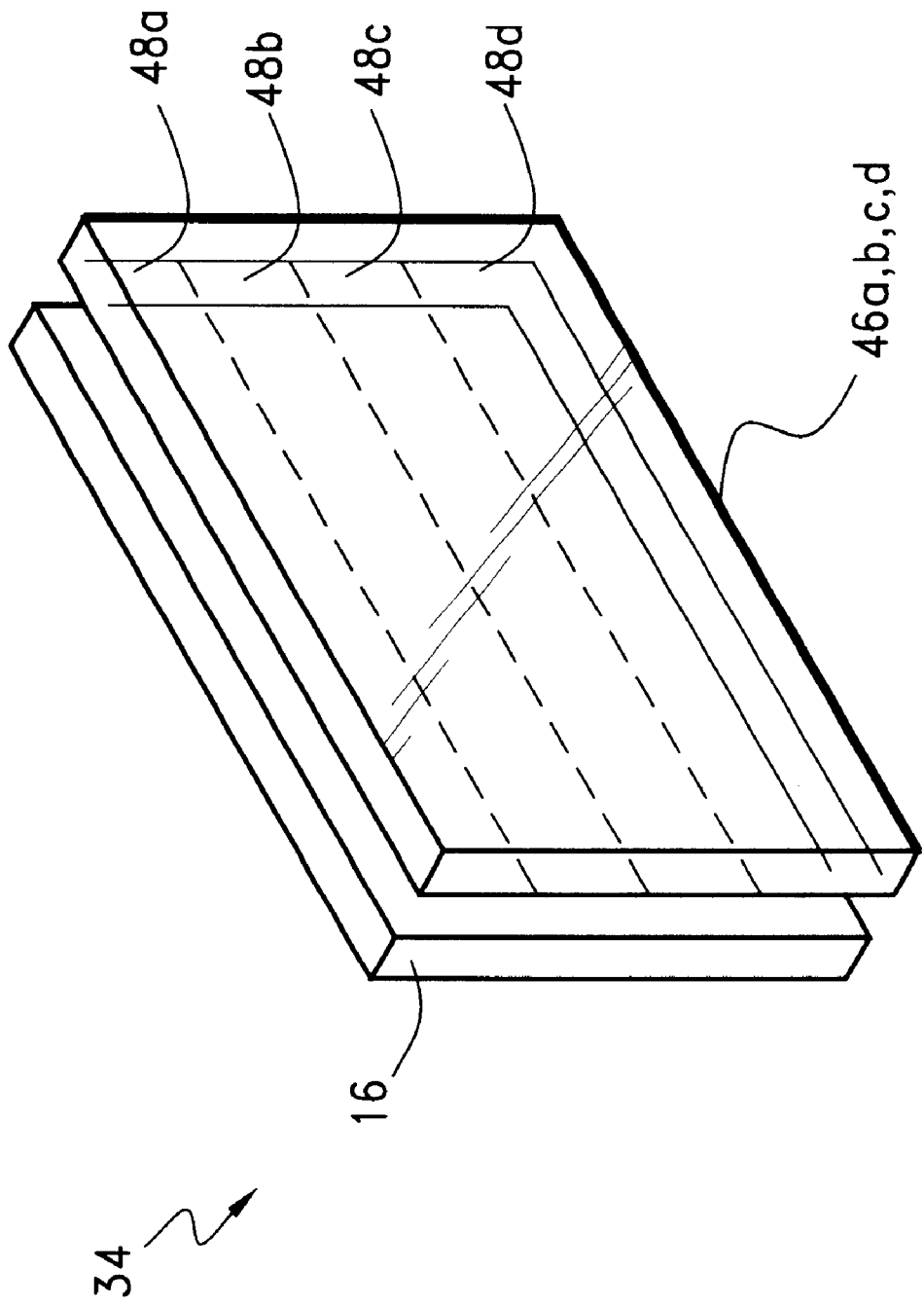
FIG. 5 is a perspective view of an ICFLCD.

FIG. 5 shows ICFLD (Integrated circuit for liquid crystal display) plus optional shutter with independently controlled sections mounted directly on the LCD not out in front of the LCD. A banded or layered beam steering device 34 of this type should be used in conjunction with an electronic shutter with an identical number of layers fitted directly over the light valve 16 as shown in FIG. 5. Instead of waiting for all the pixels on the whole light valve 16 to complete their change to the next image before opening the shutter, one can open each independently controlled section of the electronic shutter 46a, 46b, 46c and 46d immediately after the new image on that particular section 48a, 48b, 48c and 48d is formed, even though the image on areas further down the light valve is still forming. Each section 48 of the beam deflector would be timed to complete its change to the next state of molecular orientation and index by the time the image being projected on that section 48a is formed and the shutter 46a covering it is opened.

Figure 6:
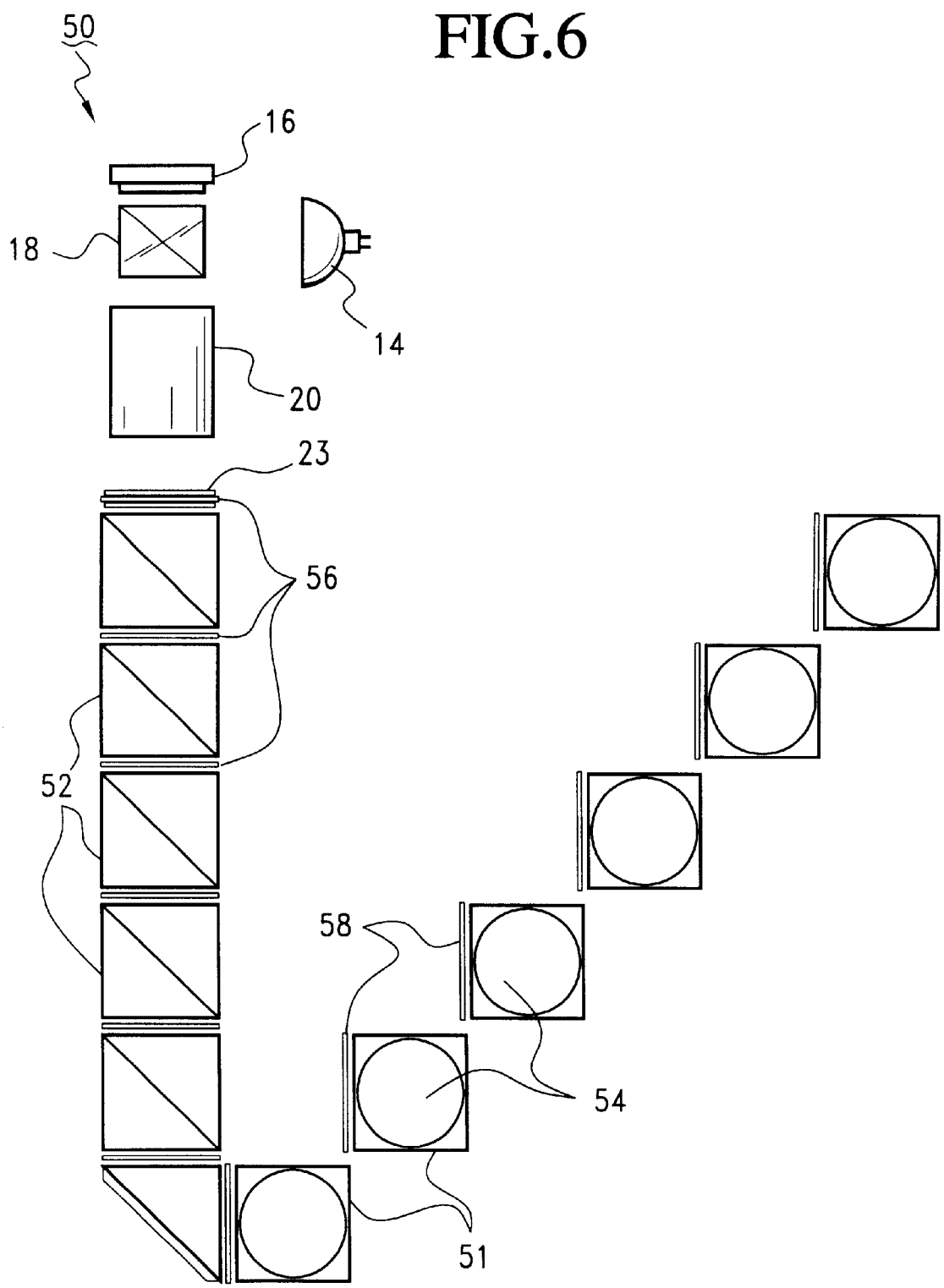
FIG. 6 is an illustration of a beam steering device using electro-optic mirrors.
Figure 7:
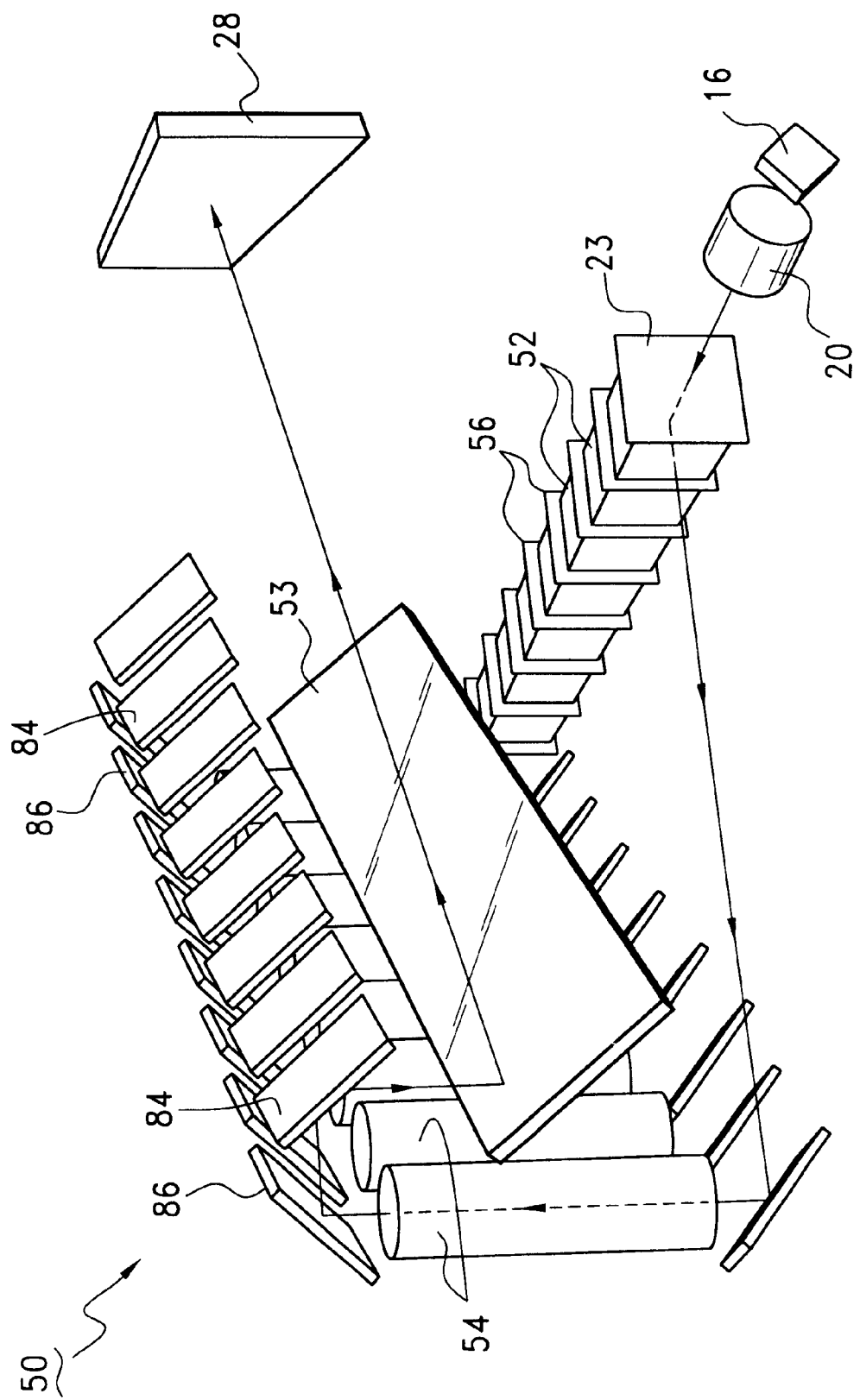
FIG. 7 is a perspective view of the electro-optic mirrors.

Polarizing beamsplitting reflectors Another, simpler electronic system 50 of electro-optic beam steering using polarizing beam splitters is possible. This system relies on a series of 45-degree electro-optic mirrors 51 arranged in a row, and is shown in FIGS. 6 and 7. FIG. 6 is a top view, and FIG. 7 shows a row of planar mirrors 51 and a perspective view of the electro-optic mirrors 52 along with a light turning mirror 53 and other components of the electro-optic beam steering system 50. The image of the light valve 16 is projected onto a screen at the end of a row of electro-optic mirrors preferably using 45 degree polarizing beam splitters 52 (ideally in the beamsplitting cube configurations shown, so as to avoid astigmatism) so that light exiting the image will pass through all of the mirrors if it is polarized in a certain direction, but will be reflected by the first 45 degree beam splitter surface it hits if polarized in the perpendicular direction. The projection lenses 54 are arranged along a 45-degree line so that the optical path to each of them is the same length (and thus the image appears to be the same size to each). Polarized light exiting the light valve 16 will normally pass through the beam splitters 52. However, a liquid crystal cell without polarizers is placed in front of each beam splitter 52. The function of the liquid crystal cells 56 is to turn the polarization direction of the light when they are activated. By activating and deactivating the cells 56 in succession, one after the other, one can cause light to reflect off each of the beam splitters 52 in succession, and enter each of the projection optics in succession. An optional set of electro-optic shutters 58 (FIG. 6) is placed in front of each of the projection lenses so that any stray light that is improperly reflected from each of the beam splitters 52 due to the glass air interfaces, contamination, imperfect beam splitting etc., is blocked out during the time periods when the beam is not directed to a given projection lens. Each of the shutters 58 would be open (i.e. transparent) only during the time that the beam of light was being directed toward the projection lens assembly behind it. This prevents weak ghost images of improper views from being seen due to a small amount of light reflecting improperly from the wrong beam splinters 52 at the wrong time.

Mechanical Beam Steering

Flipping Mirror or Rotating Mirror Wheel

One obvious method of steering the beam is to focus the image of the light valve 16 onto a light turning mirror 53 which rapidly swings back and forth across a certain angle like a door on a hinge, sending the beam across the ends of the projection lens assemblies 54. A rotating multi faceted mirror wheel could accomplish the same task. These are not a favored options since, for the sake of efficiency the beam should move as rapidly as possible from one projection lens assembly 54 to the next, and then dwell at each projection lens assembly 54 for as long as possible before moving onto the next. This sort of operation would require a flipping mirror or lens wheel which moved in a discontinuous manner, stopping and starting several times every 1/60th second. Such a system is not considered practical from a mechanical point of view.

Rotating Mirror Wheel

Figure 8:
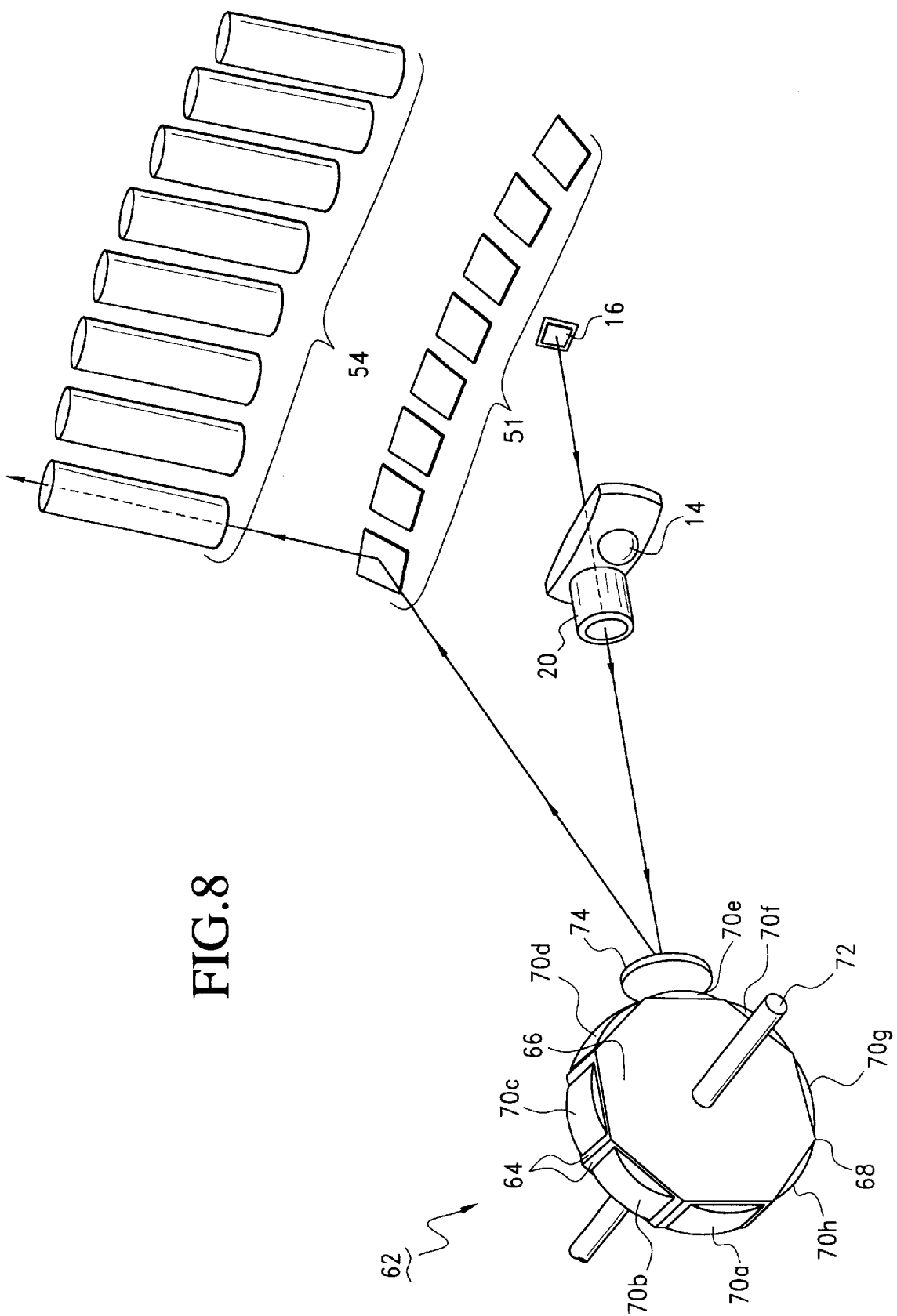
FIG. 8 is an illustration of the rotating mirror wheel used to deflect incident light into a particular projection lens.

FIG. 8 shows a rotating mirror wheel system 62. The preferred mechanical system 62 uses at least eight spherical mirrors 64 mounted on the periphery of a continuously rotating disk 66. Each mirror 64 is angled relative to the incoming beam so that it deflects light into a different one of the projection lenses 54. This mechanical beam steering concept is shown in FIG. 8.

The disk edge 68 has at least eight facets 70 each at a different angle to the axis, and on which are mounted eight spherical mirrors 64. Each facet, and its mirror, is tilted at a different angle perpendicular to the axis of rotation of the disk 66 and to the line between the optical center of the mirror 64 and the rotational axis of the disk 72. The radii of the mirrors 64 are such that the center of curvature of each mirror 64 lies along the rotational axis of the disk 66. Thus, as the disk rotates, each mirror surface travels in an arc along the surface of an imaginary sphere. A focused beam reflecting off any of the individual mirror surfaces as they rotate will therefore remain aimed at the same spot as the mirror rotates through the beam. The enlarged image of the light valve 16, projected by the relay lens 20, is formed near the surfaces of the mirrors 64. The mirrors 64 in a reference system using projection lenses at 60 cm from the disk must be tilted at angles of up to 10 degrees from side to side.

Note that, because of tilt and the need to keep the centers of curvature of the mirrors on the rotation axis, the mirrors will have one of four different focal lengths, ranging from 15.2 cm to 15.43 cm in a 15.2 cm rotational radius reference design, a variation of only 1.54%. The fact that the image is being formed at or near the surface of the mirrors 64 prevents significant variations in image size due to variations in mirror focal lengths. If the total size variation is to be kept within +−0.05% (providing pixel displacements of less than one pixel width between fields for pixels near the corners of a 1280×1024 image), an image plane within 5-mm of the mirror's surface would be required, which is easily achievable. Image proximity will also prevent distortion due to off axis imaging by the tilted mirrors 64. As an alternative, it is possible to use eight mirrors with identical radii equal to the rotational radius, even through the centers of radius for the tilted mirrors will be off center. First order calculations reveal that this will only result in a minor degree of beam movement out at the projection lenses where the spots are focused, about 3.3 mm travel for a beam focused 60-cm away as an 50-mm long mirror passes through a 31-mm diameter beam. This would cause some degree of light loss, but using mirrors with identical focal lengths would save cost by allowing use of off the shelf mirrors.

The beam exiting the relay lens 20 is focused by a simple lens 74 in the beam path so that after reflecting off the curved mirrors and passing through this lens a second time, it is focused into one of the projection optics. Some misfocusing of the beam is unavoidable due to field curvature of this lens but the effect of this should be minor, producing a small additional light loss at the far off axis zones.

Beam Splitting

As an alternative to a beam steering system, it is also possible to place a beam splitter at the location where the image from the relay lens is focused. Such a beam splitter divides the single beam entering it into several beams, and focuses each beam into one of the projection lens assemblies through the mirrors in front of the assemblies. Electro-optic shutters placed immediately in front of each projection lens assembly block all but one of the beams at any given time, so that as the different perspective views are displayed on the light valve, first one shutter and then the next open and close to allow light from each image to enter a different projection lens assembly. This arrangement, however, is very inefficient in its use of light, and is not a practical alternative in most systems.

Figure 14:
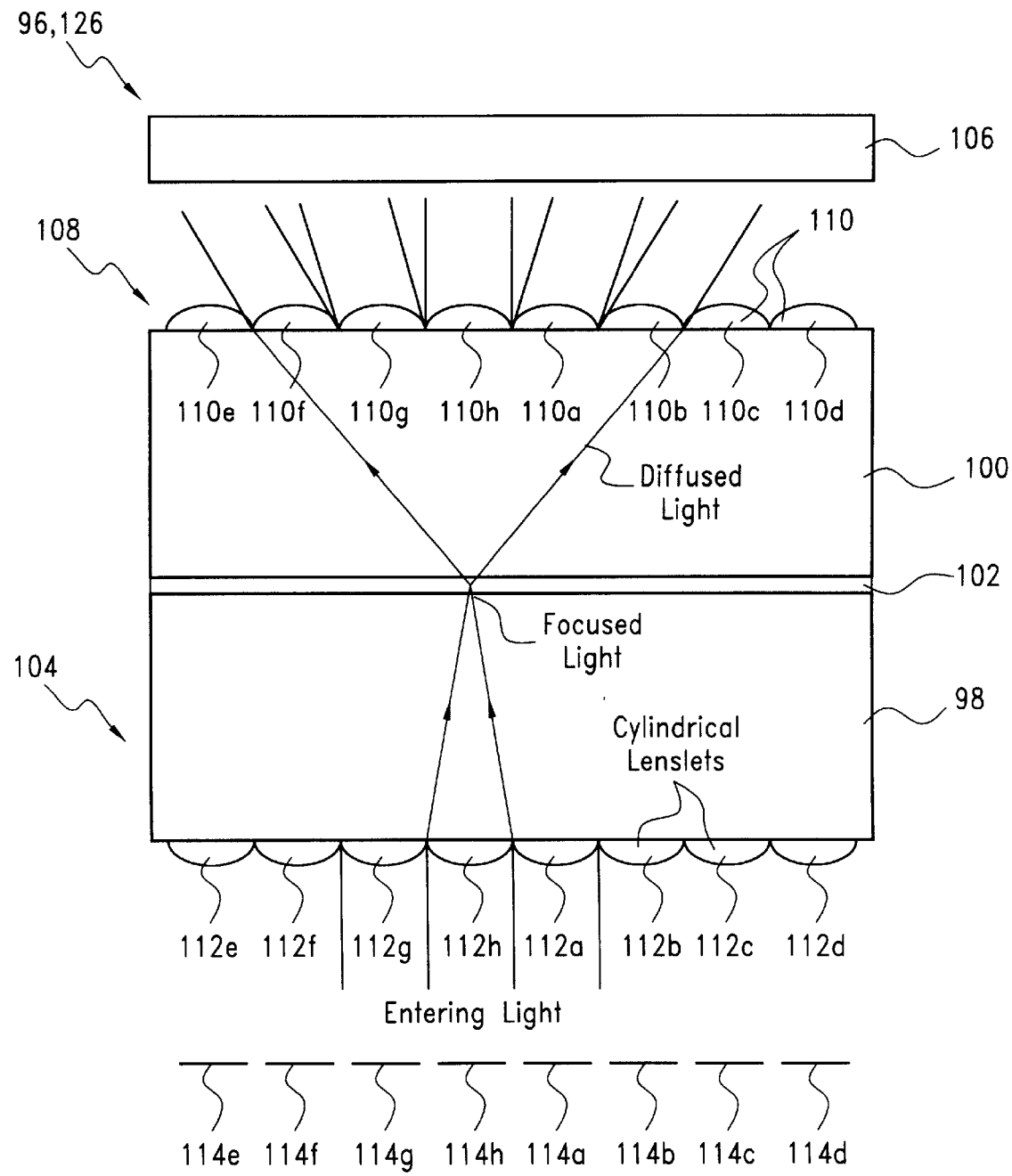
FIG. 14 illustrates a lenticular lens beam splitter.

A beam splitting device 96 also known as a lenticular lens beam splitter 96, is illustrated in FIG. 14 in cross section. It consists of two back to back lenticular lenses 98, 100 mounted on either side of a holographic or similar diffuser 102. The holographic diffuser 102 scatters light only in the direction perpendicular to the cylindrical lenslet axes (i.e., in the plane of the drawing as shown), with the lenslets situated one focal length from the diffuser. The lenslets on the side of the diffuser closest to the relay lens focus light into a series of thin lines on the diffuser, with one line in front of every lenslet. The diffuser spreads the light exiting these lines so that they encounter several of the lenslets on the other side. Each of these lenslets in turn collimates or nearly collimates the light from the lines in one direction (in the plane of the drawing as shown), creating a series of beams that exit at various angles to the normal of the diffuser. The focal ratios of the lenslets are chosen so that the exiting beams are centered on the ends of the projection lens assemblies facing the beamsplitter as seen through a tilted mirror in front of each projection lens assembly 54 (see the projection lenses section below). In general, if the two sets of lenslets have the same focal lengths, then the distance from the front (i.e., end closest to the beamsplitter) of the relay lens to the beamsplitter should equal the distance between the beamsplitter and the plane at which the aforementioned ends of the projection lens assemblies are situated.

If nothing else were present in the optical system, light would be focused into a series of vertical lines, each centered on the front end of a projection lens assembly. However, a cylindrical lens with it axis perpendicular to the axes of the lenticular lenslets can be placed above on the side of the lenticular lenslets facing the projection lens assemblies. It serves to focus the beams in the direction of its curvature so that light is focused into a spot on the aforementioned ends of the projection lens assemblies, instead of a line. The focal length of the cylindrical lens should be chosen so that an image located at the front end of the relay lens is focused on a plane where the aforementioned ends of the projection lens assemblies are located.

Projection Lenses

The projection lens configuration can vary to some extent depending on the type of beam steering system used, or the shape of the overall volume within which the display must fit. In all cases considered, however, the projection optics will consist of several identical projection lens assemblies 54 mounted side by side in a row in such a position that they can intercept the beam from the beam steering system as it jumps from position to position. Furthermore, these lens assemblies will all resemble common viewing monoculars, in which a larger, longer focal length objective faces the image in the beam steering system, and a smaller, shorter focal length lens assembly is mounted to the rear, behind the image formed by the first, so that the image is magnified, projected to, and focused at a certain plane at the lens screen.

Figure 9:
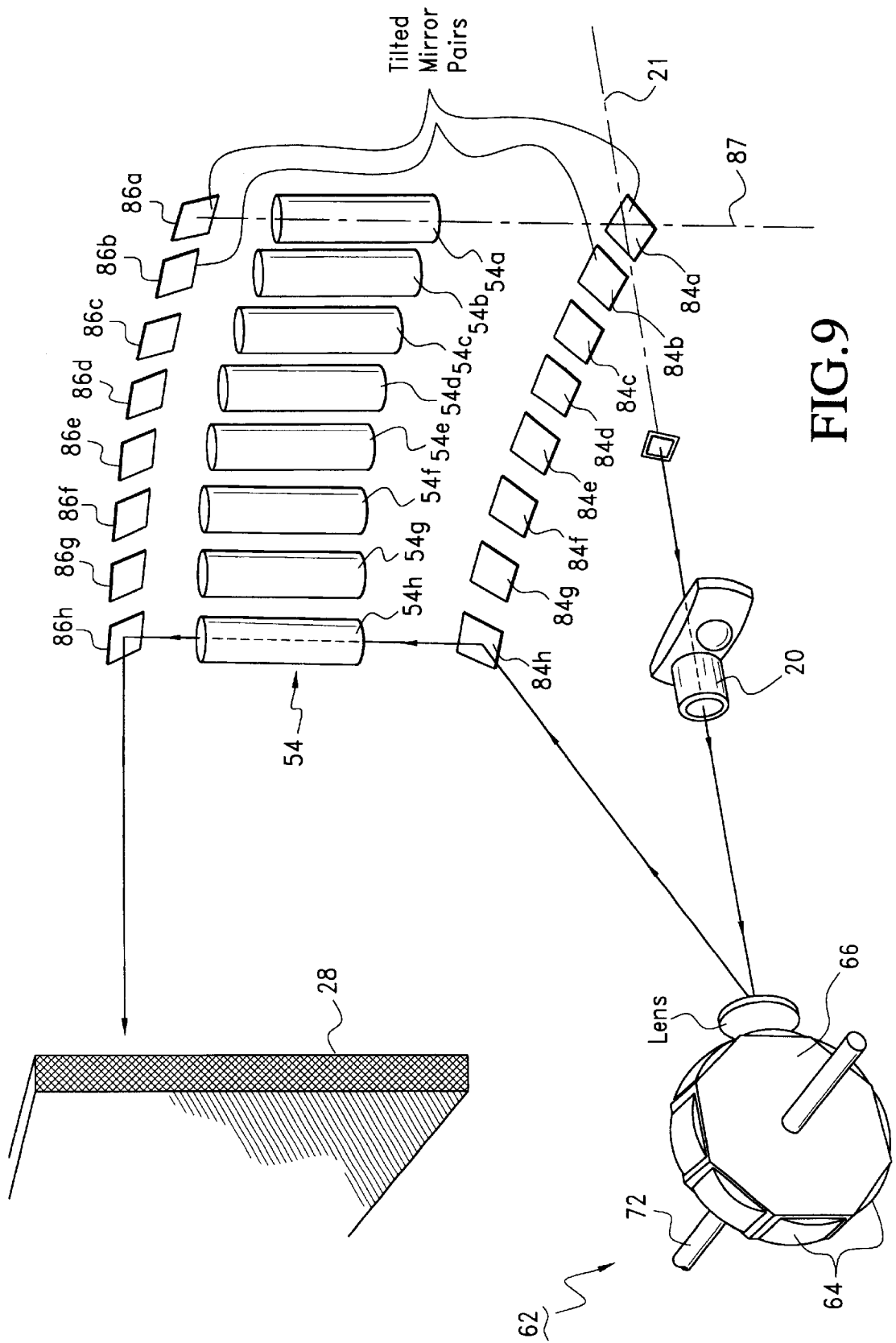
FIG. 9 is an illustration of a series of mirror pairs arranged in a periscope-like assembly.

The projection lens assemblies 54 could be used in identical configurations if the liquid crystal electro-optic 50, or lens wheel beam steering device 62 is used. A number of identical small parallel projection lenses would be placed in a row perpendicular to the surface on which the images are projected, as shown in FIG. 9, which also shows the mirror wheel beam steering system 62 in use. Since several lenses must be placed in a row, and all must see the image projected on the beam steering system, conventional projection lenses cannot be used. Conventional lenses are designed for placement very close to the image to be projected (often within several millimeters), and such close placement only allows one lens to be placed in front of the image. During development it was found that inexpensive, lightweight off the shelf monoculars with about 8× magnification and on the order of 20-mm objective diameters could be used to project images of the size range required when used at the working distances required. These lenses are usually used to look at distant objects, but by reversing them and modifying them by mounting what is normally the eye piece assembly further back front he objective, they can be used to project images onto a screen at a short distance. They are acting in effect as simple projection lenses with a very long working distance. The monoculars must produce image distortion of less than 5%, with a goal of less than 2% and must allow image pixels as small as 0.3 mm to be clearly resolved on the screen, implying an angular resolution of less than 0.8 minutes of arc.

A series of mirror pairs is shown in FIG. 9 as 84, 86. Each mirror pair 84a, 86a is arranged in a periscope like assembly as shown in FIG. 9 and is placed in front of and behind each projection lens 74, so that the projection assemblies 54, looking though the mirrors, see the image on the beam steering system 62. The mirrors 84, 86 must all be arranged so that they form the same angle with one another, eighty to ninety degrees being the ideal in most cases. Each of the mirror pairs 84, 86 is turned a different amount on a vertical axis 87 through the centers of the two mirrors in the pair, so that the optical axes 21 of the system pass through the projection assemblies and through the light valve 16. As long as the mirror surfaces are all at the same angle to one another and half of that angle from the rotational axis 72, the light valve image, as seen through the mirrors 84, 86, will not be tilted.

Although the projection lens assemblies 54 are shown between the two tilted mirrors 84, 86, this does not have to be the case. The projection lens assemblies 54 could also be positioned between the top tilted mirrors 86 and the lens assembly, and angled towards the center of the lens screen 60. In some configurations, they might even be between the beam steering device and the tilted mirrors, and angled toward the center of the beam steering device. However, in that configuration, the top angled mirrors would have to be close to one another, since a widely diverging beam exits each projection lens, and all of each would have to be intercepted by a top tilted mirror 86.

The mirrors 84, 86 may also be turned on this axis to such a degree that the light valve image is displaced in order to compensate for the off center locations of the projection optics. Due to the displacement of the light valve images, the rear lenses of the projection assemblies image the light valve images in such a manner that they are all superimposed and centered on the lens screen 60.

The mirrors and projection lenses would be mounted on a rigid custom-built stand. The mirrors will be permanently mounted. The projection lenses will be mounted to adjustment stands that allow them to be tilted in two orthogonal directions to align the eight images projected by these lenses. Adjustments of less than 0.5 mm must typically be accomplished.

When using the row of beamsplitting cubes, a slightly different arrangement of projection lenses 54 is best. This is illustrated in FIG. 7. The projection lens assemblies would be arranged along a line at 45 degrees to the line of cubes, as shows, and above a line of 45 degree mirrors, so that the distance between each lens assembly and the image in front of the line of cubes would be equal. Given that condition, all the lens assemblies could be identical.

Once again, an additional set of tilted mirror pairs 84, 86 would be placed along each of the projection lens optical paths, but in this case the best place for them would be above the projection lens assemblies 54. As before, the mirrors must all be arranged so that they form the same angle with one another, ninety degrees being the ideal in most cases. Each of the mirror pairs 84, 96 is turned a different amount on an axis through the centers of the two mirrors in the pair, so that the optical axes of the system pass through the projection assemblies and through the center of the screen assembly. Under that condition the images formed by the projection lens assemblies 54 will all fall on the lens screen and will be centered on it.

The light exiting the projection optics is directed through a large 45-degree mirror to the screen assembly 60, which is parallel to the row of lenses. The light valve must be rotated about the optical axis at a 45-degree angle to compensate. Under this condition all the images of the light valve will be oriented straight up and down on the lens screen.

Figure 10:
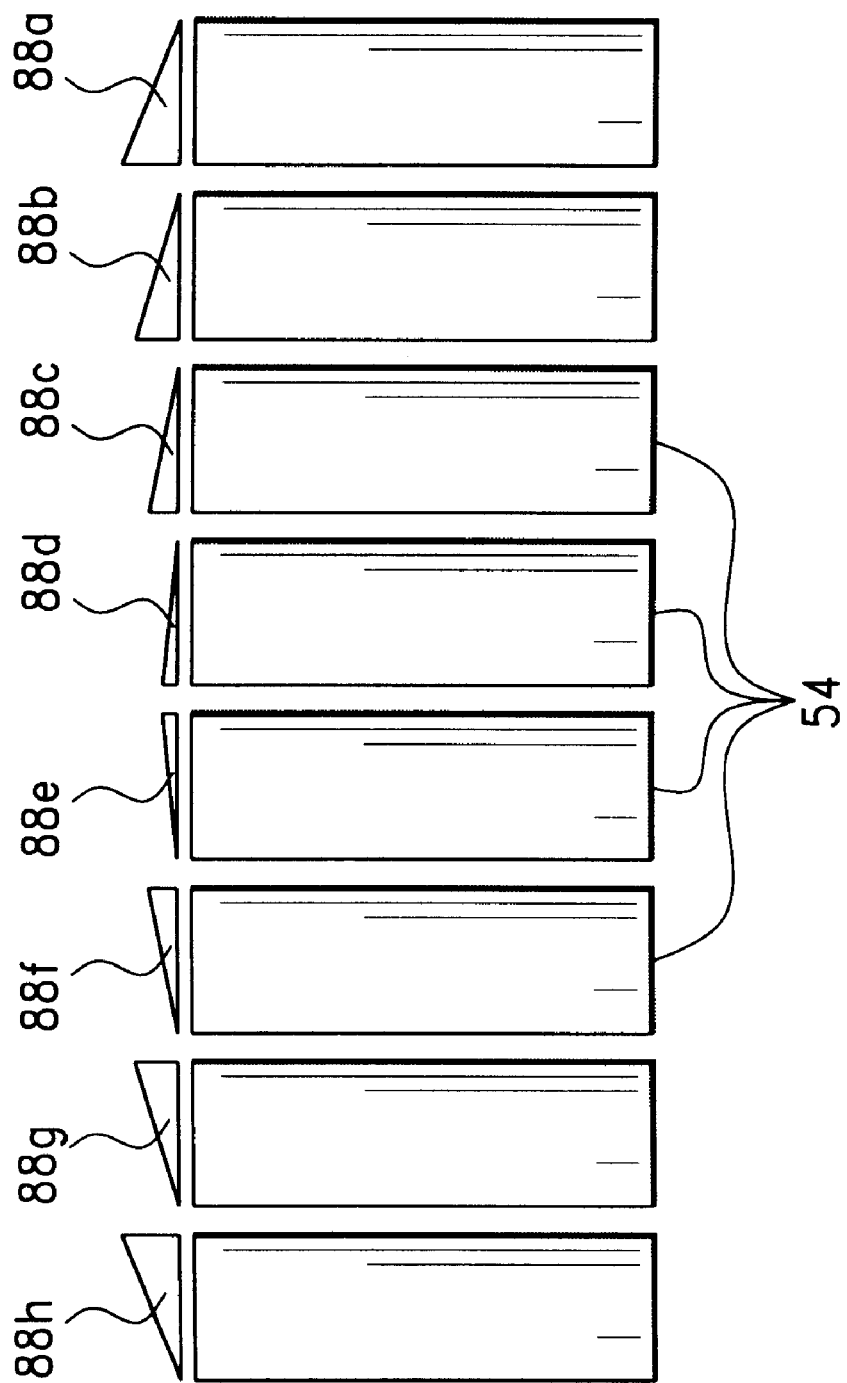
FIG. 10 is an illustration of a prism assembly that may be used with a beamsplitting cube arrangement with the projection lenses.

It should be noted that in the beamsplitting cube arrangement, an alternative to the angle mirrors exists. It is possible to replace the angled mirror sets 84, 86 with prisms 88 in front of each of the projection lens assemblies as shown in FIG. 10. The further off axis the projection lens assembly is, the greater the angle of the surfaces of the prism in front of it will make. This will cause the beam exiting each lens assembly to deflect, so that all the images line up on the lens screen, in other words, the prisms perform the same function as the mirror pairs 84, 86 in the previous example.

Figure 11:
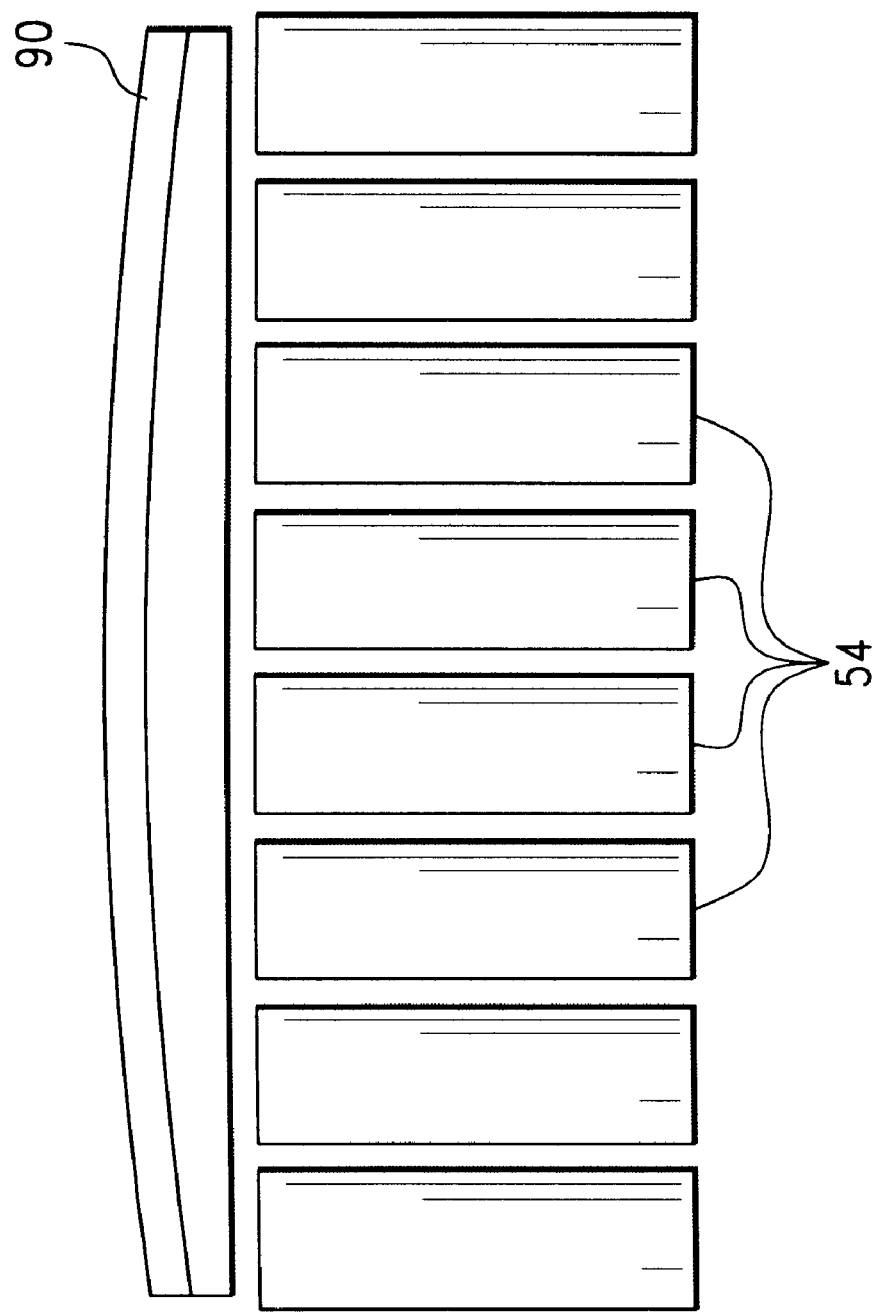
FIG. 11 illustrates a variant prism assembly that may be used as part of the beamsplitting cube arrangement.
Figure 12:
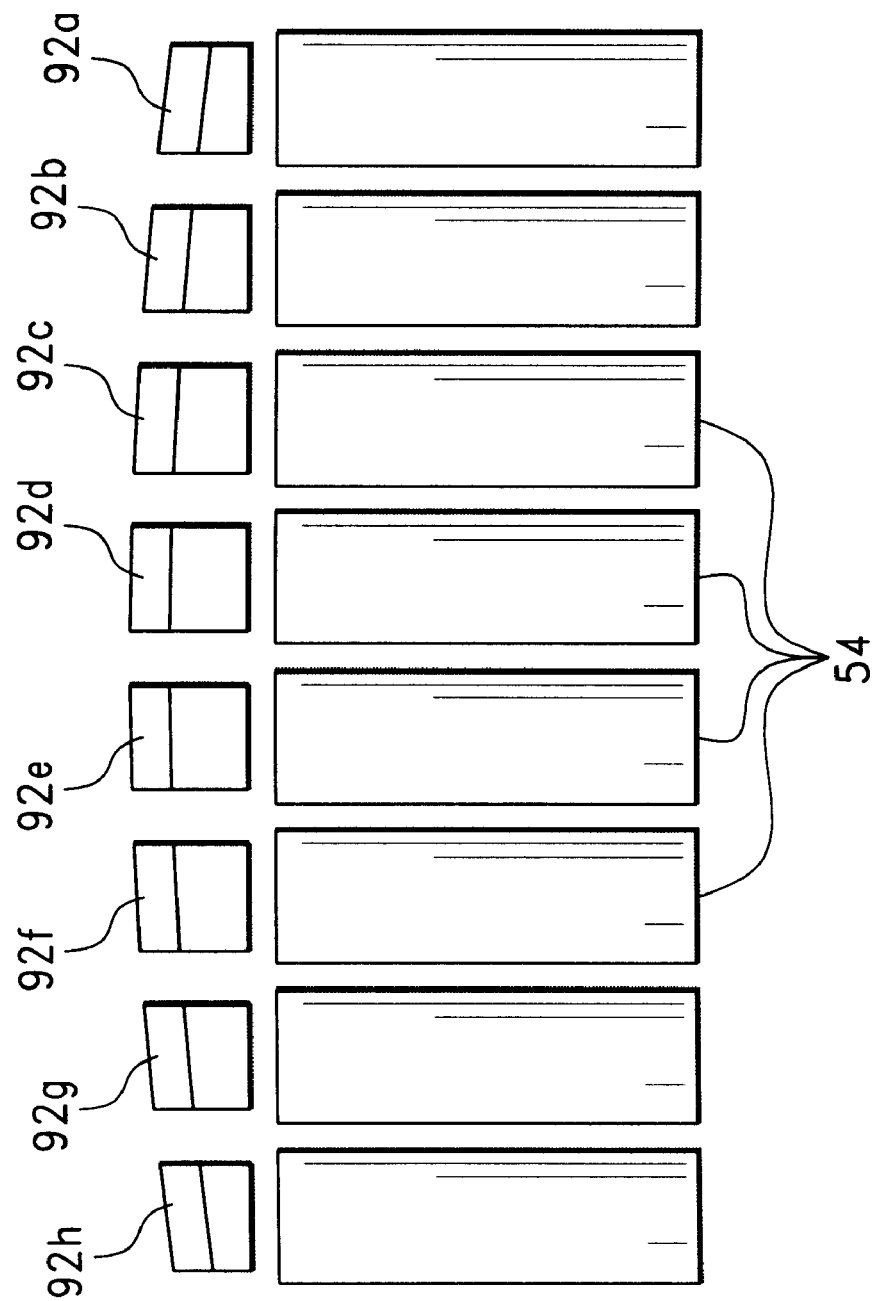
FIG. 12 illustrates a variant of the prism assembly that may be used as part of the beamsplitting cube arrangement.

A variation on this idea is to use a rectangular section equivalent to a section cut from the center of a single large achromatic lens 90, and mount it across the exit ends of the projection lens assemblies as shown in FIG. 11. The lens would have a focal length equal to the distance between the ends of the projection lens assemblies and the lens screen. Since a single lens would be rather expensive, an alternative is to use a smaller angled achromatic lens segments 92 in front of each of the projection lens assemblies as shown in FIG. 12. Each of these smaller lenses would be equivalent to a small circular section cut out from the larger rectangular lens of the previous example.

The Screen Assembly

Figure 13:
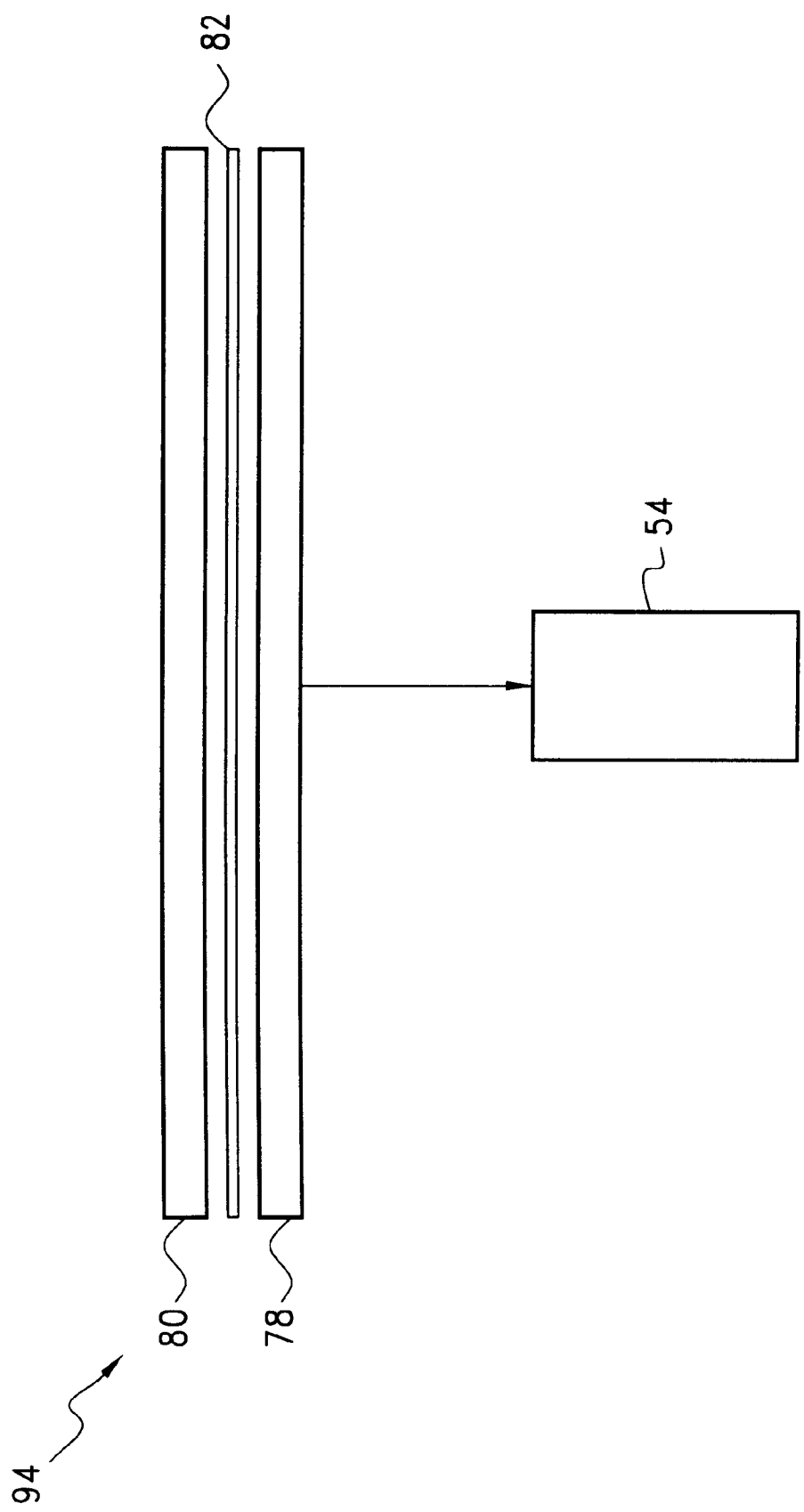
FIG. 13 illustrates a beam splitting device.

FIG. 13 shows one or more Fresnel lens 78, 80 and diffuser assembly 82 forming the "screen" 94 (one embodiment of screen 28) on which the images are projected. It will consist of at least one Fresnel lens 78 used in combination with a weak holographic diffuser 82 which diffuses light more in the vertical direction than the horizontal direction, as shown in FIG. 13. Without the diffuser 82 present the lens 78 would tend to focus the light into a small round spot, but the action of the diffuser 82 will spread light from each spot in the vertical and horizontal directions so that it falls across a rectangular shaped viewing zone ideally about 2.5 inches wide and no less than 6 inches high. The diffusion angle in the horizontal direction is chosen so that the light exiting the diffuser just fills each of the eight viewing zones formed behind it, and so that the viewing zones just touch each other. The diffusion angle in the vertical direction must be such that a comfortable vertical viewing angle is provided— light should be cast at least 15-cm. above and below the horizontal and preferably 30-cm. The images projected by the projection lenses will be focused on the diffuser.

The main qualifications for the Fresnel lens 78, 80 are sufficient diagonal size to allow unvignetted viewing of the images, with at least a 6 line per mm. ridge structure that will not degrade the resolution of images seen through it, and short (on the order of 60 cm) focal lengths. One or both of the Fresnel lenses 78, 80 can be cylindrical lenses that only focus light in the horizontal Direction. In such a case, the diffuser 82 will need to diffuse light to a larger extent in the vertical direction. Defocus across the diffuser for images projected from the farthest off axis lens assemblies is not a problem. This is due to the fact that the exit pupils of these lenses will in most cases be very small, on the order of a few millimeters. This means that the depth of field for the projected image will be very great, and the difference in distance between the lens and the center of the diffuser and the lens and the edges is not enough to cause noticeable defocus.

If the rectangles formed by the Fresnel lenses and diffuser are 2.5" wide as noted earlier, the observer's two pupils will always be in two different viewing zones if the observer is seated with this or her head near plane P. The observers two eyes will thus see two different perspective views of the scene, and thus the observer will perceive a stereoscopic image. Furthermore, as the observer moves from side to side near plane P, his or her eyes will see different sets of perspective views, and the object will seem to change perspective just as a real object would when one is moving in front of it—the observer will be able to move his or her head to look around corners and so forth.

It is also possible to use a double lenticular lens screen 126, constructed in a similar manner to the beam splitter 96 shown in FIG. 14, in place of the Fresnel lens and diffuser combination 94 described above. The double lenticular lens screen concept is well known to the art and is described in various papers including "Autostereoscopic Projection Displays" by the author and Jamie Hutchins, in Stereoscopic Displays and Virtual Reality Systems II Proceedings of the SPIE Vol. 2409, Bellingham, Wash. The lenticular lens screen 126 consists of two back to back lenticular lens sheets 98, 100 with a diffuser 102 between, usually with the plane of the diffuser being located in the focal plane of both lens sheets 98, 100.

When using a double lenticular lens screen 104, the optics are used, as before, to focus the image on the light valve 16 onto the screen 106, in this case onto the rearmost lenticular lens sheet 108. It is not necessary to align the pixels of the image precisely with the lenslets 110 of the lenticular lens sheet 108, as long as the lenticular lenslets 110 have a pitch that is considerably less than the horizontal pitch of the pixels in the projected image. The lenticular lens on the side of the screen facing the projection lens assemblies images light coming from each projection lens assembly into a different strip on the diffuser 102. Light from lenses 110a–e fall into eight strips on the diffuser 102. The lenslets of the second lenticular lens sheet, on the other side of the diffuser, image the strips 112a–e into viewing zones 114a–e at a comfortable viewing distance from the screen.

If a sufficiently strong diffuser is, used, multiple sets of viewing zones will be created to either side of the main set, since light from the strip images at the diffuser will be picked up by the lenses to either side of it as well as the lenses directly behind, By varying the pitch of the lenticular lenses on the two sheets relative to one another, and by using differing focal lengths, it is possible to control the size of the viewing zones that are imaged by the second lens as well as he distance between the lens sheet and the plane at which viewing zones are imaged. Other lens screen assemblies are known in the art. For example, large concave mirrors and retro reflective sheets have been used in autostereoscopic multiple projection systems.

Operation of the Apparatus

The light valve is repeatedly and continuously addressed and caused to display a different perspective view of a scene after each scan. Typically, these perspective views will be either views taken by a number of different cameras placed along a horizontal row in front of the scene, or else will be equivalent computer generated views of some virtual scene generated from a horizontal row of eye points.

In the preferred embodiment, the light valve is a very small, very fast image forming light valve, such as an ICFLCD. It is made to display a series of perspective views of a scene in succession at a very rapid rate. Ideally, at least eight views would be presented in $\frac{1}{60}$th of a second; thus each scene is being generated and displayed in no more than $\frac{1}{480}$th second, or about 2.1-ins.

Starting at time zero, when the display is turned on, the light valve is addressed row by row and the pixels within it will start to change state to on, off, or some gray level in between. During the time period when the pixels are changing to form the first image, or are changing from one image to the next, the electronic shutter will be off, preventing light from being projected onto the screen assembly.

After the image is formed on the light valve, the electronic shutter will open. The illumination system will concentrate bright light onto the light valve. The reflected light then passes through the relay lens.

The relay lens magnifies the images and projects them onto a plane or surface within or just behind a beam steering device. It typically enlarges the images to a size in the 30-mm. diagonal to 50-mm diagonal range. Projecting the image to the 38-mm.×38-mm size is necessary due to the very small size of the pixels on the original display, and the geometry of the system.

The beam steering device causes the beam of light exiting from the image to change direction and to be focused so that it enters each of several projection lenses, one after the other in a repeating sequence. The operation of the beam steering device is timed so that the beam exiting these projected images "jumps" rapidly from one projection lens to the next one while a new image is being formed on the light valve, then stays stationary at the projection lens for a certain period of time while the new image on the light valve is stable. The beam seems to "jump" from lens to lens.

The projection lenses are placed in a row in front of the beam steering device. Each projects a larger version of the image seen in the beam steering device onto a larger screen assembly.

The screen assembly, which contains one or more large positive lenses (such as Fresnel lenses), reimages the exit pupil of each of the projection lenses into a different region of space in the area where the observer sits, thus creating viewing zones from within which different images are visible. The lens (lenses) of the screen focuses (focus) light from each projection lens into a spot at a certain distance in front of it. A diffuser within the lens assembly serves to enlarge the spot into a viewing zone of 31 mm in width and at least 300 min in height, and also evens the light distribution within the resulting rectangle.

After the image is formed on the light valve, it will be displayed for a certain period of time, said time being typically short, less than 2-ms. At the end of this time period the address process starts again, row by row, and the light valve pixels start to change state to form the next image. At the same time that the address begins, or shortly before it, the electronic shutter will be turned off to block light As the light valve image changes, different perspective views of the scene are projected onto the screen assembly, and light coming through each is directed into a different rectangular area in front of the lens. Thus a row of adjacent rectangles of light is formed within a plane at a certain distance from the Fresnel lens. A different perspective view of the scene is visible from within each of the rectangles. If N projection lenses are present, then the light valve will display N different perspective views of a scene as seen from N different cameras or eye points spaced along a horizontal line in front of the scene. After the N views have been presented while the beam is scanned between the N projection lenses, the process repeats with N perspective views of the next image of the scene, etc.

The width and spacing of the rectangles is such that an observer with one eye in one rectangle will always have the other eye in another rectangle and the two eyes will see two different perspective views of the scene, and the observer will see an image with depth. As is usually the case with such multi-perspective systems, the observer's eyes will not have to be exactly in the plane in order to see a 3D image. Movement within a certain distance forward and backward from the plane where the spots are formed will be possible without losing the 3D image.

In the case of computer generated images, These perspective views are images of a scene generated from a series of eye points spaced evenly along a horizontal line in front of the scene, with one eye point for each viewing zone. For video images the perspective views would be taken by a series of cameras spaced evenly along a line in front of a scene, with one camera for each viewing zone. Generating perspective views in this manner for an autostereoscopic display is well known to the art.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. An apparatus for generating and projecting autostereoscopic images, comprising:
   (a) a light source;
   (b) a light valve, optically connected to the light source;
   (c) a relay lens, optically connected to the light valve and located between the light valve and the beam steering device, and designed to form an image of the light valve;
   (d) a beam steering device, optically connected to the relay lens;
   (e) a plurality of projection lenses, optically connected to the beam steering device on the side of the beam steering device opposite the light valve;
   (f) a focusing lens, optically connected to the plurality of projection lenses; and
   (g) a screen assembly optically connected to the focusing lens.

2. The apparatus of claim 1, further comprising a plurality of mirrors optically connected to the projection lenses, for focusing light exiting the projection lenses onto the focusing lens.

3. The apparatus of claim 1, where the screen assembly comprises a diffuser.

4. The apparatus of claim 1, where the focusing lens is a Fresnel lens.

5. The apparatus of claim 1, where the focusing lens is a double lenticular lens.

6. The apparatus of claim 1, where the projection lenses are horizontally disposed between the projection lens and the beam steering device.

7. The apparatus of claim 2, where the plurality of mirrors are arranged in pairs, each pair comprising a first mirror between the beam steering device and the projection lens and a second mirror between the projection lens and the screen, the first mirror of each projection lens making a first angle with an optical axis of the projection lens and the second mirror of each projection lens making an equal first angle with the optical axis of the projection lens.

8. The apparatus of claim 1, further comprising a prism placed in front of each projection lens, and optically connected thereto.

9. The apparatus of claim 1, where the light valve is a LCD.

10. The apparatus of claim 1, where the beam steering device is a series of electro-optic mirrors, that are turned on and off in sequence.

11. The apparatus of claim 1, where the beam steering device is a liquid crystal beam deflector.

12. The apparatus of claim 1, where the beam steering device is a polarizing beamsplitting reflector.

13. The apparatus of claim 1, where the beam steering device is a rotating mirror wheel.

14. A method of generating and projecting autostereoscopic images, comprising:
   (a) concentrating bright light onto a light valve;
   (b) spatially and temporally modulating the intensity of light, thereby creating rapidly changing images;
   (c) magnifying the images;
   (d) projecting them onto a first image plane or surface;
   (e) focusing the beams of light forming a first image on a first image plane;
   (f) steering the beams of light exiting from the first image on the first image plane so that it enters each of several projection lenses;
   (g) reimaging the first image onto a second image plane; and
   (h) simultaneously reimaging the light exiting a pupil of each of the projection lenses into a different region of space, thus creating a plurality of viewing zones where an observer may view different images.

15. The method of claim 14, comprising passing the light exiting the pupil of each projection lens through a focusing lens and a screen assembly.

16. A projection apparatus, comprising:
   (a) an optical image source;
   (b) a plurality of projection lenses;
   (c) a beam steering device, optically connected to the image source, the beam steering device transmitting light received from the image source onto each projection lens in succession;
   (d) a focusing lens, optically connected to the beam steering device;
   (e) a screen assembly, optically connected to the focusing lens, the screen assembly and the focusing lens working together to focus light into a plurality of viewing zones.

17. The apparatus of claim 16, where the focusing lens is a Fresnel lens.

18. The apparatus of claim 16, where the focusing lens is a double lenticular lens.

19. The apparatus of claim 16, further comprising a mirror arrangement, located intermediate the projection lenses and the focusing lens and optically connected to each, for directing light exiting the projection lenses onto the focusing lens.

20. The projection apparatus of claim 16, where the optical image source is a LCD.

21. A method for generating autostereoscopic images of a scene, comprising:
   (a) rapidly displaying a series of perspective views of the scene onto a LCD screen;
   (b) Reflecting light beams off of the LCD screen;
   (c) routing each reflected light beam from each perspective view of a scene into a projection lens corresponding to that perspective view.

22. The method of claim 21, further comprising rapidly shifting the direction of the reflected light beam from one projection lens to the next during an interval when the perspective view is changing to prevent a second image from being visible from the same position that a first image is already visible from by using a blocking device such as a blocking screen or projecting into space during the transition.

23. An apparatus for generating autostereoscopic images, comprising:
   (a) an illumination system;
   (b) a LCD optically connected to the light source, displaying a series of perspective views of a scene in sequence;

(c) a plurality of projection lenses, each projection lens corresponding to a particular perspective view;

(d) a beam steering device, optically connected to the LCD and the projection lenses, that transmits one or more light beams reflected from each perspective view on the LCD to the projection lens corresponding to that view.

24. The apparatus of claim 23, where the beam steering device is a series of electro-optic mirrors, that are turned on and off in sequence.

25. The apparatus of claim 23, where the beam steering device is a liquid crystal beam deflector.

26. The apparatus of claim 25, where the beam steering device is a polarizing beamsplitting reflector.

27. The apparatus of claim 23, where the beam steering device is a rotating mirror wheel.

28. The apparatus of claim 23, where the beam steering device is a beam splitting device, comprising:

(a) a beam splitter that divides each single light beam entering it into several light beams;

(b) a plurality of electro-optic shutters, one shutter being located immediately in front of each projection lens, only one shutter being open at any given time.

29. The apparatus of claim 23, further comprising a mirror assembly, where the plurality of mirrors are arranged in pairs, each pair comprising a first mirror between the beam steering device and the projection lens and a second mirror between the projection lens and the screen, the first mirror of each projection lens making a first angle with an optical axis of the projection lens and the second mirror of each projection lens making an equal first angle with the optical axis of the projection lens.

30. The apparatus of claim 23, further comprising a prism placed in front of each projection lens, and optically connected thereto.

31. The apparatus of claim 23, further comprising one or more lens sections, placed in front of each projection lens, and optically connected thereto.

\* \* \* \* \*